United States Patent

[11] 3,574,268

[72] Inventor Frederick A. Buse
 141 Loma Alta Ave., Los Gatos, Calif. 95030
[21] Appl. No. 800,586
[22] Filed Feb. 19, 1969
[45] Patented Apr. 13, 1971

[54] TOOL SHARPENING APPARATUS
 8 Claims, 3 Drawing Figs.
[52] U.S. Cl. .................................................. 51/92,
 51/110, 51/218, 51/224
[51] Int. Cl. .................................................. B24b 3/52,
 B24b 41/02
[50] Field of Search .................................................. 51/72.2,
 76.1, 84.1, 86.1, 91.1, 92.2, 92, 92 (HK), 94,
 109.1, 111 (BRR), 113, 114, 115, 124, 221.1, 224

[56] References Cited
 UNITED STATES PATENTS
 642,275 1/1900 Zacharias ..................... 51/92

| 1,043,948 | 11/1912 | Mandley | 51/92 |
| 1,385,649 | 7/1921 | Sherman | 51/92 |
| 2,191,600 | 2/1940 | Wahl | 51/92 |
| 2,192,981 | 3/1940 | McMillen | 51/92 |

Primary Examiner—Othell M. Simpson
Attorney—Jack M. Wiseman

ABSTRACT: A scissor-sharpening apparatus wherein a vise holds a scissor blade to be sharpened and the vise is pivotally mounted on a carriage. Supporting the carriage are longitudinally spaced rollers which travel along a rod. The carriage travels along the rod in a rectilinear path and also is movable along an arcuate path about the axis of the rod. The rectilinear path for the carriage is parallel to the axis of a grinding wheel. In this manner, the scissor blade is brought into position parallel with the grinding wheel and is freely movable toward and away from the grinding wheel to effect the sharpening of the scissor blade.

PATENTED APR 13 1971  3,574,268

INVENTOR.
FREDERICK A. BUSE
BY Jack M. Wiseman
ATTORNEY

TOOL SHARPENING APPARATUS

BACKGROUND OF THE INVENTION

The present invention relates in general to tool-sharpening apparatus, and more particularly to scissor-sharpening apparatus.

Scissor-sharpening apparatus with pivotal movement and movement about a rectilinear path have been known. Disclosures of tool-sharpening apparatus may be found in the following U.S. Pat. Nos.: 80,344; 2,153,476; 2,565,291; 2,636,326; and 2,753,666.

SUMMARY OF THE INVENTION

An object of the present invention is to provide tool-sharpening apparatus in which the tool-supporting carriage moves with reduced friction and yet is relatively free of grinding dust.

Another object of the present invention is to provide tool-sharpening apparatus which maintains the tool edge to be sharpened parallel to the axis of the grinding wheel while enabling improved angle adjustment between the tool edge and the grinding wheel.

A tool-sharpening apparatus in which a tool is mounted on a carriage that has longitudinally spaced means for travelling along a rod in a rectilinear path and for moving about the axis of the rod in an arcuate path.

Other and further objects and advantages will appear from the following description taken in conjunction with the accompanying drawings.

DESCRIPTION OF THE PREFERRED EMBODIMENT

Figure 1:
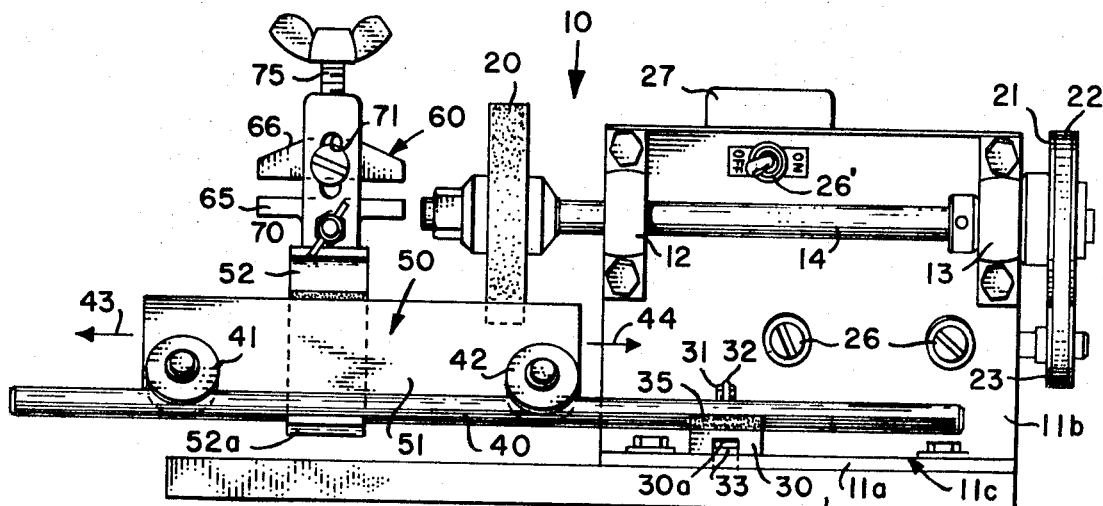
FIG. 1 is a front elevation view of the tool-sharpening apparatus of the present invention.
Figure 2:
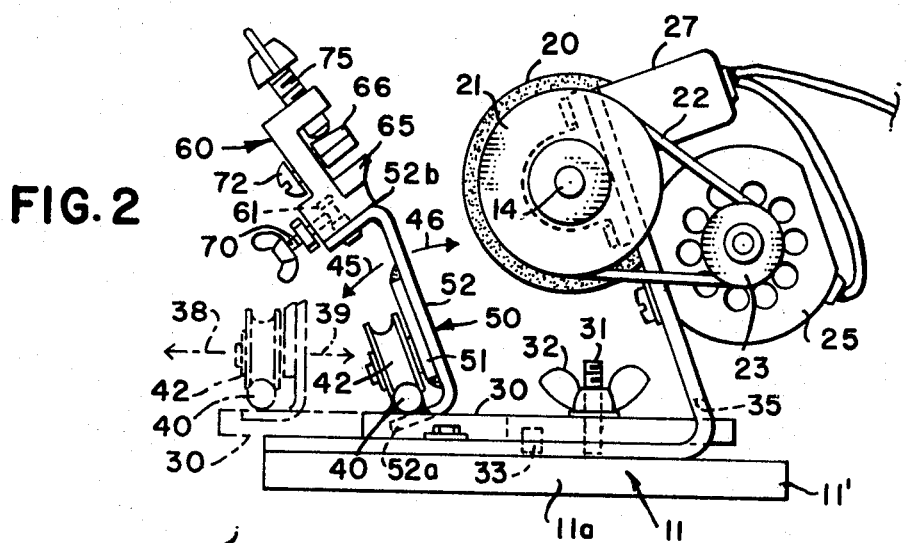
FIG. 2 is a side elevation view of the tool-sharpening apparatus shown in FIG. 1.

Illustrated in FIGS. 1 and 2 is the tool-sharpening apparatus 10 of the present invention which comprises a suitable angle mounting plate 11 that is adapted to be fixed to a suitable supporting surface 11'. The angle plate 11 includes a base section 11a and an upwardly directed support section 11b.

Mounted at the upper portion of the supporting section 11b by bolts and nuts are longitudinally spaced bearings 12 and 13. Supported by the collars 12 and 13 for rotation is a shaft 14. Fixed to the shaft 14 for rotation therewith is a grinding wheel 20.

For imparting rotation to the shaft 14, a driven pulley 21 is fixed to the shaft 14. Trained around the driven pulley 21 is an endless belt 22. The endless belt 22 is also trained around a drive pulley 23. The drive pulley 23 is fixed to the shaft of a suitable motor 25 to be driven thereby. Suitable bolts 26 secure the motor 25 to the support portion 11b of the mounting plate 11. A suitable supply of electrical power operates the motor 25 through an on-off switch 26' and connection box 27.

Thus, an operator turns the switch 26' to the on position to operate the motor 25 for rotating the drive shaft thereof. This action results in the rotation of the drive pulley 23 for the rotation of the shaft 14 through the belt 22 and the driven pulley 21. As a consequence thereof, the grinding wheel 20 rotates in a well-known manner about the axis of the shaft 14.

A slotted bar 30 is fixedly secured to the base portion 11a of the angle mounting bar 11 in the transverse direction. Received by the slot 30a of the bar 30 and also by the base portion 11a is a bolt 31 on which a wing nut 32 is mounted in threaded engagement. In addition thereto, a guide bolt 33 is received by the slot 30a and the base portion 11a. From this arrangement, the wingnut 32 is loosened to move the bar 30 relative to the base portion 11a is a bolt 31 on which a wingnut 32 is mounted in threaded engagement. In addition thereto, a guide bolt 33 is received by the slot 30a and the base portion 11a. From this arrangement, the wingnut 32 is loosened to move the bar 30 relative to the base portion 11a transversely toward or away from the support portion 11b. Tightening the nut 32 fixedly secures the bar 30 to the base portion 11a. A slot 35 is formed at the junction between the base portion 11a and the support portion 11b in transverse alignment to the bar 30 to permit the bar 30 to advance transversely through the support portion 11b.

According to the present invention a rod 40 is fixedly secured to the bar 30. Thus, adjustment of the bar (See FIG. 2) relative to the base 11a serves to regulate the transverse position of the rod 40 as shown by arrows 38 and 39. Supported by the rod 40 are longitudinally spaced rollers 41 and 42. The rollers 41 and 42 are formed with annular flanges with annular grooves therebetween so that the rollers 41 and 42 are able to move longitudinally or axially along the rod 40 and also are able to move in arcuate paths about the axis of the rod 40. Specifically, each roller moves in the axial direction of the rod 40, such as shown by the arrows 43 and 44 (FIG. 1) and also moves in an arcuate path about the axis of the rod 40 as shown by the arrows 45 and 46 (FIG. 2).

Supported by the rollers 41 and 42 for movement therewith is a carriage 50. The carriage 50 has a plate member 51 extending between the rollers 41 and 42 and also a substantially U-shaped vise-holding member 52. The U-shaped member 52 at the lower end thereof has a flange 52a, which engages the rod 40, whereby the carriage 50 is retained at all times on the rod 40 by preventing displacement therefrom in the radial direction. Stated otherwise, while the carriage 50 is movable about the axis of the rod 40, it is not displaced or removed therefrom.

Figure 3:
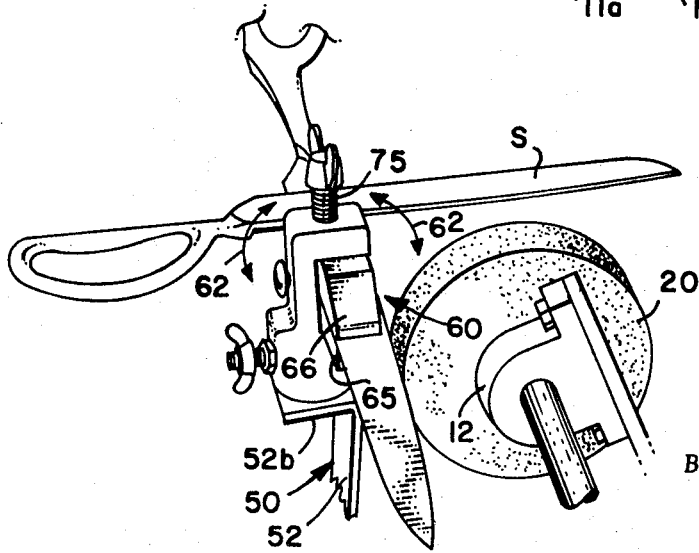
FIG. 3 is a fragmentary diagrammatic illustration of a vise employed for holding a tool to be sharpened by a grinding wheel, the vise and grinding wheel being a part of the tool-sharpening apparatus shown in FIGS. 1 and 2.

An upper flange 52b of the holding member supports a vise 60. The vise 60 is attached to the flange 52b through a post 61, (FIG. 2) whereby the vise 60 to be rotated about the axis of the post 61 as shown by the arrows 62 (FIG. 3). A suitable bolt 70 is loosened to adjust the vise 60 relative to the post 61 and is tightened to hold the vise 60 in a fixed position relative to the post 61. The vise 60 has a fixed jaw 65 and a movable jaw 66. A slot 71 (FIG. 1) is formed in the vise 60 to receive screw 72 that is carried by the movable jaw 66. In this manner, the movable jaw 66 is guided in its movement relative to the fixed jaw 65.

A scissor S has its blade to be sharpened placed between the jaws 65 and 66 of the vise 60 with the cutting edge facing the grinding wheel 20. An adjustable screw 75 is received by the vise 60 and engages the movable jaw 66 to clamp the blade of the scissor S between the jaws 65 and 66 in a secured manner.

From the foregoing, it is to be observed that the axis of the rod 40 is parallel with the axis of the grinding wheel 20 and the axis of the shaft 14. In the operation of the tool-sharpening apparatus 10, the carriage 50 can be moved toward or away from the grinding wheel 20 by adjusting the bar 30 for movement in the transverse direction relative to the base portion 11a. In addition thereto, the carriage 50 is movable along the rod 40 in a rectilinear path and in an axial direction relative to the rod 40. This movement is parallel to the axis of the grinding wheel 20. Further, the carriage 50 is movable toward and away from the grinding wheel along an arcuate path about the axis of the rod 40. Lastly, the vise 60 can be adjusted for movement about the axis of the post 61. This adjustment is for setting the blade edge of the scissor S relative to the periphery of the grinding wheel 20.

I claim:

1. A tool-sharpening apparatus comprising a rod, longitudinally spaced rollers on said rod movable along a path in the axial direction of said rod and movable along an arcuate path about the axis of said rod, each of said rollers being formed with annular flanges defining an annular groove therebetween, whereby said rollers move along a path in the axial direction of said rod and move in an arcuate path about the axis of said rod, a carriage supported by said rollers for movement in a rectilinear path parallel to the axis of said rod and movable along an arcuate path about the axis of said rod, said carriage includes means for engaging said rod to prevent radial displacement of said carriage relative to said rod, and a toolholder mounted on said carriage for movement therewith.

2. A tool-sharpening apparatus as claimed in claim 1 wherein said means included in said carriage for engaging said rod comprises a flange for engaging said rod.

3. A tool-sharpening apparatus as claimed in claim 1 wherein said means included in said carriage for engaging said rod supports said toolholder.

4. A tool-sharpening apparatus as claimed in claim 1 wherein said means included in said carriage for engaging said rod comprises a member with a lower flange for engaging said rod and and with an upper flange for supporting said toolholder.

5. A tool-sharpening apparatus as claimed in claim 1 and including a mounting plate with a base section and a support section, means mounting said grinding wheel on said support section for rotation, and means adjustably supporting said rod for moving the axis thereof relative to the axis of said grinding wheel.

6. A tool-sharpening apparatus as claimed in claim 5 wherein said toolholder is mounted on said carriage through a post and is pivotal about the axis of said post.

7. A tool-sharpening apparatus as claimed in claim 6 and comprising drive means for rotating said grinding wheel mounted on said support section.

8. A tool-sharpening apparatus as claimed in claim 7 wherein said drive means includes a motor and a drive mechanism interconnecting said motor with said grinding wheel.